3,050,362
PROCESS FOR PRODUCING TITANIUM TETRACHLORIDE

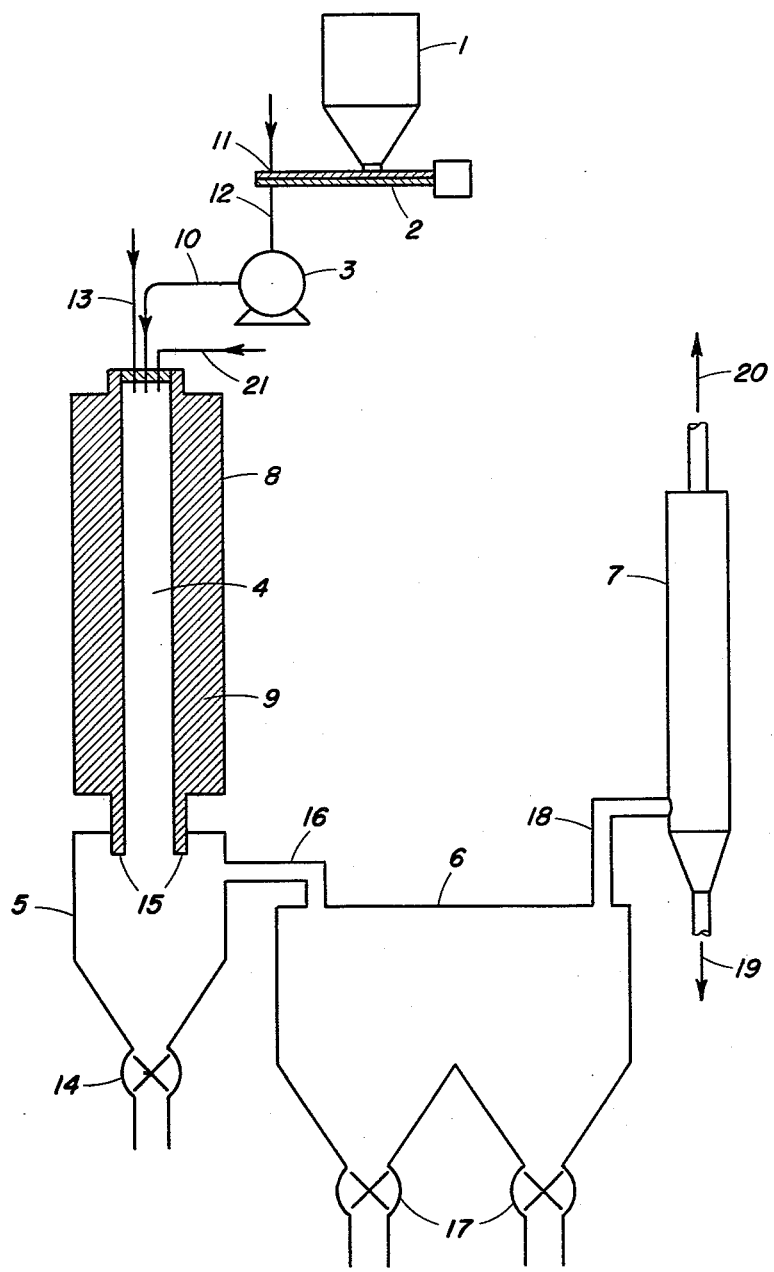

Assur G. Oppegaard and Barth Hauge, Fredrikstad, Norway, and Helge Aas, Lewiston, N.Y., assignors to National Lead Company, New York, N.Y., a corporation of New Jersey
Filed Jan. 15, 1958, Ser. No. 709,151
Claims priority, application Norway Feb. 6, 1957
7 Claims. (Cl. 23—87)

This invention relates to the production of titanium tetrachloride by flash chlorination of titaniferous material which may contain substantial amounts of undesirable impurities, such as chlorinatable compounds of alkali metals and alkaline earth metals, including magnesium.

Many processes are known for producing titanium tetrachloride by chlorination of titaniferous materials. In the static bed process the titaniferous material is usually admixed with a carbonaceous reducing agent and agglomerated and a chlorine containing gas is passed through a static layer of such agglomerates at an elevated temperature. There are a number of difficulties inherent in the static bed chlorination processes, for instance the problem of producing briquettes which are not easily broken by handling, problems in connection with a localized overheating of the bed causing sintering of the charge, the build up of impurities in the charge and the fact that the relatively small surface area of the charge exposed to the chlorine results in a low capacity and difficulties in operating the chlorinator without additional heat. Fluid bed processes have also been proposed for the chlorination of titaniferous materials. This type of process has many advantages, but considerable difficulties have been encountered when employing feed materials which contain chlorinatable compounds of alkali metals and alkaline earth metals including magnesium, which result in a sticky condition of the reactants in the fluid bed and may cause complete plugging of the reactor by cementing together the reactor bed particles. Difficulties are also encountered in fluosolids chlorination of materials having a fine particle size due to dust losses, plugging and channelling effects. The capacity of a fluo-solids chlorinator depends upon the gas velocity employed and this cannot exceed a certain rate due to the tendency of the gases to carry finely divided material out of the reactor.

In most of the known processes it is difficult to employ titaniferous raw materials which contain substantial amounts of impurities such as chlorinatable compounds of alkali metals and alkaline earth metals including magnesium. Partially volatile chlorides, such as $MgCl_2$, $CaCl_2$, NaCl and $FeCl_2$ will, if formed in too great amounts, accumulate in the chlorinator in the molten state at the furnacing temperatures generally used, thereby coating the ore particles and slowing down the chlorination reaction. Other impurities such as iron compounds cause difficulties as the formed iron chlorides tend to cause plugging of the pipe lines and of the condensing and collecting equipment.

Titaniferous iron materials may be upgraded by a solid state reduction followed by fine grinding and separation of the reduced iron from a high titania fraction, or by a reducing smelting thereby producing a pig iron and a high titania slag. Several attempts have been made to break down the ilmenite structure by treating ilmenite with caustic soda or soda ash under reducing conditions. The iron is then reduced to the metallic state, and the titania reacts to form a sodium titanate slag. The slags produced according to these methods are hardly amenable to chlorination by previously known methods, due to their high contents of magnesium, calcium or sodium.

Many methods have been proposed for removing or inactivating the objectionable impurities contained in titaniferous materials, but none has yet met with any considerable degree of success.

It seems that none of the previously known methods for chlorinating titaniferous ores or concentrates rich in chlorinatable compounds of alkaline metals and alkaline earth metals, including magnesium, has reached the commercial stage.

An object therefore of the present invention is to provide an improved method for chlorinating titaniferous ores or concentrates rich in chlorinatable compounds of alkali metals and alkaline earth metals including magnesium on a commercial scale.

A further object of the invention is to provide a method for continuously chlorinating titaniferous materials which may contain substantial amounts of impurities such as compounds of alkali metals, alkaline earth metals including magnesium, and iron, in such a manner that the liquid chlorides formed of the impurities do not detrimentally effect the chlorination process.

A still further object of the invention is to provide a method for continuously chlorinating titaniferous material containing substantial amounts of the oxides of magnesium, iron and calcium by a flash reaction technique wherein the gaseous reaction products are cooled in a manner to selectively separate liquid chlorides of magnesium and calcium from gaseous chlorides of iron and titanium.

The invention contemplates broadly chlorinating a finely divided titaniferous material by a process hereinafter called "flash chlorination" which comprises continuously feeding the finely divided titaniferous material and finely diveded carbon together with a chlorinating gas to the top of a vertical or inclined reactor to form a suspension, passing the suspension of finely divided titaniferous material, carbon and chlorinating gas through the reactor, thereby effecting chlorination of the titaniferous material, and recovering titanium tetrachloride from the gaseous reaction products.

The finely divided solids and the chlorinating gas are transported co-currently in a downward direction through the reactor, the finely divided solids being intimately mixed with and forming a suspension in the chlorinating gas. The temperature in the reactor during chlorination should be maintained above 700° C. and preferably between 1000 and 1400° C. In this temperature range the suspended metal compounds will react with chlorine in the presence of finely divided carbon to form metal chlorides some of which will be in liquid form and some vaporous, depending upon the melting points.

The lower end of the reactor is connected with a chamber hereinafter called the dust pot which is situated below the reactor.

The temperature inside the dust pot is so controlled that the reaction products will be cooled on entering the pot and the higher-melting liquid chlorides formed in the reactor such as those of the alkali metals and alkaline earth metals including magnesium, and ferrous chloride, will be present only in the solid state in the dust pot. Besides acting as a cooling chamber, the dust pot will effect separation of unreacted and partially reacted material together with solidified chlorides from the vaporous products. The uncondensed gases from the dust pot are passed on to condensing and collecting equipment to recover the titanium tetrachloride.

The high-melting, liquid chlorides formed during the reaction and held in suspension in the gas stream will be cooled and solidify while in suspension on passing into the dust pot and the main part of these solid chlorides will accumulate at the bottom of the dust pot together with unreacted and partially reacted material. Part of the liquid chlorides formed during reaction will come into contact with the reactor walls and adhere to these. Thus the inside of the reactor will be covered with a liquid film consisting of chlorides such as $CaCl_2$, $MgCl_2$, NaCl, and $FeCl_2$. Some of the solid feed material in the reactor will come into contact with the surface of this film and adhere thereto. It has been found that at the operating temperatures employed this viscous film will flow slowly down the reactor walls. The lower end of the reactor should therefore be so constructed that the viscous film with detach itself from the reactor walls, dripping into the dust pot and solidifying to form beads in the bed of dust which collects at the bottom of the pot. In this connection it is clear by reference to FIG. 1 that the inner wall of the reactor is of uniform diameter throughout its length including the lower end thereof which extends into the dust collector. Hence the cross sectional area of the gas stream within and issuing from the reactor into the dust collector is of uniform diameter and as a consequence any liquid chlorides entrained in the gas stream and/or deposited on the walls of the reactor are permitted to fall freely, i.e. without obstruction into the dust collector. The liquid chlorides which flow down the reactor walls will thus solidify without coming into contact with the walls of the dust pot, and may therefore easily be removed from the dust pot together with the fine dust consisting of unreacted and partially reacted material and fine particles of solid chlorides.

The solids which are collected at the bottom of the dust pot, may be removed continuously or intermittently by any convenient type of solid transportation mechanism, such as a screw conveyor, a star wheel, etc.

The temperature in the dust pot is preferably kept at about 300° C. so that condensation of ferric chloride will not take place. The separation of ferric chloride and titanium tetrachloride from the gaseous reaction products may be effected at later steps in the process by first selectively condensing the ferric chloride and subsequently condensing the titanium tetrachloride from the remaining product gases. Further advantages of keeping the dust pot at a temperature of about 300° C. are that the vaporous titanium tetrachloride will not be condensed and absorbed by the dust and that the hygroscopic chlorides of Ca, Mg and Fe will be completely dry, resulting in a free-flowing material which may easily be recovered from the dust pot.

The furnace may conveniently be a cylindrical shaft furnace constructed of heat and corrosion resistant brick work, encased in a steel shell. The top of the furnace is sealed except for the inlet nozzles for the finely divided titaniferous material and finely divided carbon, and the chlorine or chlorine containing gases (including, if desired, waste gases from oxidation of titanium tetrachloride). The chlorination reaction is exothermic in nature and hence normally can be expected to supply its own heat for reacting the constituents. In case it is found desirable to supply extra heat in addition to that liberated by the chlorination reaction, a controlled amount of oxygen or air may be introduced into the reactor together with some additional carbon, the carbon burning with the oxygen to liberate the desired amount of heat.

Substantially any titaniferous material may be chlorinated according to the present process such as, for instance, mineral rutile, ilmenite, titaniferous iron ores and concentrates, titanium slags and other synthetic titanium dioxide products. The invention is particularly adaptable to the treatment of titaniferous oxidic slags which result from electric furnace smelting of titaniferous ores, such as ilmenite, to obtain iron values therefrom. Such slags usually contain relatively large amounts of alkali metal, alkaline earth metal and magnesium compounds, such as Na, Ca, and Mg compounds, as well as compounds of other members of the alkali metal and alkaline earth metal groups. These materials are converted to chlorides which melt between 600 and 1000° C. The amounts usually present in such slags are 1–10% MgO, 1–10% CaO, etc.

Another type of slag well adapted to flash chlorination is a slag obtained by dry reduction of iron values in ilmenite, followed by fine grinding and separation of the metallic iron from the slag fraction.

The undesirable impurities comprising compounds of alkali metals and alkaline earth metals, including magnesium, in the titaniferous slags may arise from the content of such impurities in the raw ore or from fluxes added during the reduction operation.

In chlorination of a titaniferous material entrained in a chloriniferous atmosphere it is necessary that the particle size of the titaniferous material and the solid reducing agent be very fine. A finely ground material will expose a large surface to the attack of the gaseous reactants, resulting in a rapid conversion of the titanium oxide compounds to titanium tetrachloride. However, a too fine particle size should be avoided due to the pulverizing costs.

It has been found that the fineness of the titaniferous material should be in the order of 0.3–80 microns with an average of 3–40 microns and that the finely divided carbon, coke, petroleum coke, anthracite, or the like, should have an average particle size of approximately 5–50 microns, but may have an even wider particle size distribution.

It has been found desirable to use an excess of carbon over that necessary to react with the oxygen of the chlorinatable compounds of the titaniferous material during the chlorination to insure conversion of all of the oxygen to a mixture of carbon monoxide and carbon dioxide. When oxygen or air is introduced to provide additional heat, additional carbon to combine with the added oxygen must be introduced. Usually carbon is added to the charge in an amount corresponding to 15–40 percent by weight of the total weight of the titaniferous material. It has been found preferable to blend the mixture of titaniferous material and carbon well before feeding it to the furnace although each constituent may be introduced into the furnace separately.

The amount of chlorine introduced into the reactor must be controlled so that there will be sufficient chlorine present to react with the chlorinatable metal values of the titaniferous material which is entrained in and moving co-currently with the chlorinating gas. Usually the amount of chlorine or chlorine-containing gas introduced will be equivalent to the amount theoretically required to chlorinate all the metal values of the entrained material, such as titanium, iron, magnesium, calcium, sodium, etc. In certain cases it may, however, be advantageous to use an amount of chlorine less than that theoretically required in order to obtain a higher chlorine utilization.

Experiments have shown that the chlorination reaction is very fast when using the present chlorination technique, and a retention time of only 1–2 seconds in the reactor is required to convert from 80 to 95% of the titanium values in the reactants to titanium tetrachloride. Due to the short retention time of the reactants in the reactor, and the fact that the solids and gases are moving co-currently in a downward direction at only a slightly different velocity, it is important to introduce the titaniferous material, carbon and chlorine in the correct proportions and at a uniform rate. A change in the feeding rate of titaniferous material and carbon should always be accompanied by a corresponding change in the feeding rate of the chlorine. A pulsating or uneven introduction of the solids or of the chlorine will result in lower efficiencies of operation and lower yields.

The finely divided titaniferous material and finely divided carbon as well as the chlorine or chlorinating gas may be introduced into the reactor by any convenient method provided the finely divided solids are intimately mixed with and entrained in the chlorinating gas in the reactor. It has been found convenient to introduce the finely divided solids and the chlorinating gas through separate openings located at the top of the reactor. Admixture of the solid feed with chlorine before introduction into the reactor may easily result in a somewhat sticky condition of the solids, thereby complicating the feeding operation and counteracting a good dispersion of the solids in the chlorinating gas stream.

A convenient way of introducing the solid feed into the reactor is to use a carrier gas, such as nitrogen, carbon monoxide or carbon dioxide, to blow the fine solids under a slight pressure into the chlorinator. If additional heat is required, oxygen or air may also be used as the carrier gas, or introduced into the chlorinator together with the chlorine.

To obtain as high relative velocity as possible between the solid feed and the chlorinating gas it might, in some cases, be found to be advantageous to introduce the fine solids together with the carrier gas in a direction coaxial to the reactor axis and to direct the chlorine tangentially into the reactor thereby producing a rotary or spiral motion of the gas and the solid fines. While it is preferred to charge a mixture of the titaniferous material and the reducing agent through the same nozzle into the reaction chamber, it will be obvious that the benefits of the invention may also be obtained by introducing the solid components separately into the reaction zone.

The flash chlorination reaction may be started in various ways, as for instance by preheating the furnace by hot gases or flames injected through an opening located at the top of the furnace and directing the gases or flames through the furnace. When the interior of the furnace has reached a temperature at which the chlorination may be initiated (500–1000° C.), titaniferous material and carbon together with chlorine are continuously introduced thereby starting the chlorination. It may be advantageous to feed some oxygen during the first period of the chlorination to add extra heat of reaction. In a sufficiently large reactor the heat of the chlorination reaction will suffice to maintain the temperature during the chlorination.

The reaction temperature should preferably be kept between 1000 and 1400° C. An upper limit is set primarily by the corrosion resistance of the furnace lining. The temperature will be determined by the heat of reaction as against the losses due to radiation and heat taken out by the outgoing gases and unreacted or partially reacted solids. The chlorination temperature may be controlled by several methods, as for instance by adjusting the feeding rates of the titaniferous material and coke together with chlorine, by adding oxygen if auxiliary heat is required, or by diluting the chlorination gas to lower the temperature. The amount of carbon in the feed will to some extent influence the $CO/CO_2$ ratio in the exit gas, the formation of $CO_2$ giving by far the greatest heat of reaction.

The chlorination gas may be introduced in an amount to give a linear gas velocity from about 0.1 meter to several meters per second, calculated on the free cross section of the reactor, at reaction temperature and at the pressure prevailing in the reactor. The length of the reaction zone is among other factors dependent upon the gas velocity used and it may vary from about one to several meters.

Experiments have been shown that when chlorinating a titaniferous slag by the present flash chlorination technique a production rate of more than 0.5 kg. $TiCl_4$ per $dm.^3$ reaction space per hour can easily be obtained, this capacity being equal to, if not higher than, the capacity of a fluid bed chlorinator.

The production capacity of a fluid bed chlorinator is primarily set by the linear gas velocity. The velocity usually employed is about 15 cm./sec., calculated on the free cross section of the reactor, at reaction temperature and one atmosphere pressure. A velocity of 15 cm./sec. corresponds to a production capacity of 5.8 kg. $TiCl_4$ per $dm.^2$ per hour calculated at 800° C. and assuming that pure chlorine is used and that the chlorine utilization is 100%. If the reaction space is said to be confined within the fluidized bed, then another expression for the maximum production capacity would be 0.4 kg. $TiCl_4$ per $dm.^3$ reaction space per hour, assuming a bed height in fluidized state of 1.5 m.

When using the "flash chlorination" technique the gas velocity may be varied within wide limits. Gases and solids are moving cocurrently and a high gas velocity (say 1 m./sec.) is not detrimental to operation as it would usually be in a fluid bed operation.

The factor controlling the production capacity when flash chlorinating is the minimum retention time of the solids in the reactor required to convert the titanium values to titanium tetrachloride. The minimum retention time depends upon a number of different factors, such as for example the reactivity of the raw material, particle fineness, relative velocity between solids and gas (turbulence), reaction temperature, etc.

Due to the fact that the gas velocity in the flash chlorination may vary within wide limits a chlorinator for this process may have a great height, being many times that which could be efficiently utilized in a fluid bed chlorinator. A flash chlorinator having a diameter of for instance 3 m. could be 10–20 m. high, the full volume of which would be efficiently utilized for chlorination. A fluid bed chlorinator of the same diameter would hardly have a height of more that 4–5 meter, as the efficient height of the bed would usually not be of more than 1 to 2 m.

The existence of liquid chlorides inside the reactor such as those of the alkali metals and alkaline earth metals, including magnesium, will depend upon the temperature and the partial pressure of these chlorides in the reaction gas. If the hottest zone in the chlorinator is kept at a temperature above the dew point for these chlorides in the existing reaction gas, the liquid chlorides will not appear in this zone. A high temperature chlorination might be advantageous due to the higher reaction rate obtained.

The temperature of the product gas at the lower end of the reactor is, however, controlled so that alkali metal and alkaline earth metal chlorides will condense, but care must be taken not to cool the product gas to such a low temperature that the liquid chlorides adhering to the lower walls of the reactor will solidify thereby effecting a steady accumulation of these chlorides inside the reactor. An important feature of this invention is therefore to carefully control the temperature within the reactor and at no point allow the temperature of the product gases to fall to such an extent that the chlorides of alkali metals and alkaline earth metals, including magnesium, and ferrous chloride, or mixtures thereof, will appear in the solid state or otherwise accumulate in the reactor.

On the other hand it is important that the liquid chlorides, held in entrainment in the descending gas stream, solidify as soon as possible after they have reached the dust pot, and that they solidify while held in gaseous entrainment and without being brought into contact with the walls of the dust pot. It is, therefore, desirable that the temperature of the product gases at the lower end of the reactor be kept as low as possible, without allowing liquid chlorides adhering to the reactor walls to solidify, so that a quick cooling of the product gases and the entrained particles is effected when they enter the dust pot.

To effect a temperature control of the product gases it is advantageous to have a cooling zone, as indicated in the drawing by the reduced cross section of the lower end of the reactor, below the reaction zone so that the product gases, when entering the dust pot, will have been cooled as far as possible while still maintaining any chlorides adhering to the lower end of the reactor in the fluid state.

It is also possible to cool the product gases by introducing cold, recycled chlorination off-gases, liquid titanium tetrachloride, or liquid or solid ferric chloride into the cooling zone or directly into the dust pot.

The moving film of fluid chlorides in the reactor will flow towards the lower end of the reactor which preferably projects a short distance into the dust pot. As shown in the drawing, the inner wall of the reaction chamber is of uniform diameter throughout its length including the portion thereof extending into the dust pot and hence the liquid film will drip from this projecting end into the dust pot and beads or drops of the chlorides will solidify in a bed of unreacted or partially reacted material which accumulates in the pot.

The liquid chlorides entrained in the exit gas stream will be cooled very fast and solidify while in entrainment when entering the dust pot, which is preferably held at a temperature of about 300° C.

The drawing is a diagrammatic illustration, of an embodiment of an apparatus in which the invention may be carried out in a continuous type of operation showing in general combination, a suitable hopper 1 and feeding apparatus 2, a disintegrator 3, a vertical reaction chamber 4, a dust pot 5, a chamber 6 for condensation and settling of $FeCl_3$, and a condenser 7 for recovering the titanium tetrachloride.

The reactor may consist of an outer shell 8 lined with a corrosion resistant and heat insulating material 9 and may, or may not, at the inner surface have a silica tube.

In operation a mixture of finely divided titaniferous material and finely divided carbon is introduced into the reactor 4 by means of the feeding apparatus 2, which passes the mixture from the hopper 1 into a disintegrator 3, from which the mixture is carried into the reactor 4 through a tube 10 by means of a small stream of nitrogen which may be introduced into the feeding apparatus at point 11, passing through the tube 12 into the disintegrator 3. The disintegrator 3 will agitate the mixture of finely divided titaniferous material and carbon so that it will form a suspension in the carrier gas thereby being easily transported by the gas through tube 10 into the reactor 4. Chlorine is admitted through a separate tube 13.

The mixture of titaniferous material and carbon entering the reactor through the tube 10 is admixed with and entrained in the chlorine gas stream entering the reactor through the tube 13. The gas-solid suspension is moving downward through the hot reactor 4 while the chlorination takes place. Unreacted and partially reacted particles of the titaniferous material and excess carbon accumulate at the bottom of the dust pot 5, which is kept at a temperature of about 300° C. The deposit in the dust pot may be periodically or continuously removed, as for instance by a star wheel 14. Liquid chlorides of magnesium, calcium, iron, etc. adhering to the furnace walls will flow down the vertical walls and at the lower end of the reactor 15, they will drop off into the dust pot 5 and solidify in a bed of dust.

Part of the fine dust is carried away by the product gases through a tube 16 into a chamber 6. The temperature inside the chamber 6 is controlled so that ferric chloride, but not the titanium tetrachloride will condense, i.e. the temperature is kept slightly above the dew point of the titanium tetrachloride in the exit gas. Most of the solid $FeCl_3$ together with dust carry-over from the dust pot 5 will settle at the bottom of the chamber 6. The mixture of $FeCl_3$ and dust accumulating at the bottom may be continuously or intermittently removed, for instance by means of star wheels 17. The remaining product gases are passed through the outlet tube 18 of chamber 6 and into condensing equipment for titanium tetrachloride shown generally at 7, and the titanium tetrachloride product being collected at 19, the off-gases being passed through a pipe 20 to the stack (not shown).

In the starting-up period a preheating gas may be introduced through the tube 21, and if additional heat is required during the chlorination some oxygen may be introduced through this tube.

The reactor is of very simple construction with no moving parts and no restrictions which could easily be plugged up.

In a sufficiently large reactor it may be advantageous to introduce the mixture of titaniferous material and carbon through several feed openings located at the top of the reactor. It may also be desirable to introduce the chlorine through several nozzles distributed vertically along the reactor in order to obtain an increasing gas velocity throughout the reactor and to increase the retention time of the solids in the reactor as compared with the retention time obtained when all the chlorine is introduced at the top of the reactor.

Under certain conditions it may be necessary to add extra heat over that liberated by the chlorination reaction, to keep the furnace at the desired reaction temperature. This may be the case when using dilute chlorine, such as recovered from pigment production by oxidation of titanium tetrachloride with air, or when using a titaniferous material containing large amounts of unchlorinatable compounds. Under such circumstances the heating of the inert nitrogen and/or the cold inert reactants may consume more heat than that which is liberated by the chlorination reaction. As already mentioned extra heat may be supplied by introducing some oxygen or air together with some excess carbon. The carbonaceous reducing agent is oxidized during the process to CO and $CO_2$. The presence of excess carbon at the high temperature usually employed in chlorination tends to convert the carbon to CO with less generation of heat. When, therefore, the highest heat generation is required a great excess of carbon should not be used.

To supply extra heat it is obviously also possible to preheat one or more of the raw materials. The disintegrator 3 and the feed pipe 13 may be fitted with suitable heating equipment. The solid feed mixture may for instance be preheated to a temperature of 300–500° C. in the disintegrator and introduced at this temperature into the reactor.

The unconverted portion of titaniferous material and carbon collected in the dust pot 5 may be recovered to a considerable extent. Depending upon the efficiency of chlorination, it may be advantageous to subject the unreacted material to a water leach to remove water-soluble chlorides such as $MgCl_2$, $CaCl_2$, $FeCl_2$, thereafter drying the leached material and recycling it to the chlorinator either separately or admixed with fresh material.

The reactor in FIGURE 1 is shown in the vertical position. It will, however, be evident that the invention may also be carried out in a reactor inclined to the horizontal, the slope of the reactor walls being sufficient to permit the liquid chlorides which condense in the reactor to flow down the walls and out of the reactor.

The following examples illustrate the invention employing an apparatus substantially as shown in FIG. 1.

*Example I*

A finely divided mixture of 7 parts by weight of a titaniferous slag and 3 parts by weight of petroleum coke was continuously fed to the top of the chlorinator at a rate of 3200 g./h. using nitrogen, at a rate of 0.078 part by weight per part by weight of solid feed mixture, as the carrier gas. The chlorinator was preheated to about 1100° C. to initiate the reaction.

The slag had the following composition:

| | Percent |
|---|---|
| $TiO_2$ | 83.6 |
| Ti ··· of total Ti | 40.0 |
| Fe, total | 4.71 |
| Fe, metal | 0.45 |
| MgO | 6.45 |
| CaO | 0.6 |
| $SiO_2$ | 4.0 |
| $Al_2O_3$ | 1.5 |

The size of the slag particles was from 2–5 microns and the petroleum coke was crushed to below 40 microns. The slag and coke were well blended before feeding the mixture into the chlorinator.

Chlorine was introduced at the top of the reactor through a separate tube at a rate of 1.69 parts by weight per part by weight of slag. This was the amount of chlorine theoretically required to react with all the $TiO_2$, FeO, CaO, and MgO in the introduced raw feed.

The cylindrical reactor had a total length of 1.5 m. and an internal diameter of 80 mm. The reaction temperature was about 1200° C. at the hottest zone and somewhat lower at the upper and lower ends of the reactor.

A production rate of 0.50 kg. $TiCl_4$ per dm.$^3$ reaction space per hour was obtained with a conversion of the titanium-values in the slag to $TiCl_4$ of 84%. More than 90% of the Ca, Mg, and Fe-values in the slag was converted to chlorides. The chlorine utilization was 85%.

The linear gas velocity in the reactor was approximately 40 cm. per second, calculated at the reaction temperature (1150° C.) and one atmosphere pressure. The retention time of the gaseous components was consequently about 3.5 seconds, whereas the retention time of the solid particles was estimated to be from 1 to 2 seconds. No build-up of chlorides was observed at the lower and colder end of the reactor, as the liquid film of chlorides and dust adhering to it constantly flowed down the reactor walls and dropped into the dust pot below.

*Example II*

In this example dust and chlorides, which had collected in the dust pot during the chlorination of fresh slag feed, were subjected to a water leach to remove the soluble chlorides, thereafter the leached product was dried and subjected to re-chlorination. The leached and dried product contained 37% $TiO_2$ and 55% carbon and was fed into the chlorinator at a rate of 1600 g. per hour, using nitrogen, at a rate of 0.093 part by weight per part of solid feed, as the carrier gas. Chlorine was introduced at a rate of 0.66 part by weight per part by weight of solid feed, this being sufficient to react with all the $TiO_2$ in the feed material. The linear gas velocity in the reactor was approximately 13 cm. per second.

The chlorination furnace was the same as used in Example I and the reaction temperature was about 1200° C. in the hottest zone.

Approximately 83% of the Ti-values in the leached and dried feed material were converted to $TiCl_4$.

*Example III*

In order to compare the results obtained with the slag feed material and the recycled material with those obtained with a substance containing a compound of tetravalent titanium only, and no disturbing elements as Fe, Ca, Mg, etc. it was also tried to chlorinate a technical grade titanium dioxide. The same apparatus as in the previous examples was used.

The solid feed consisted of a well blended mixture of 7 parts by weight of titanium dioxide and 3 parts by weight of petroleum coke, ground to less than 40 microns. This mixture was introduced into the reactor at a rate of 3000 g. per hour using nitrogen at a rate of 0.075 part by weight per part by weight of solid feed mixture as the carrier gas. Chlorine was introduced at a rate of 1.24 parts by weight per part by weight of solid feed mixture, which was sufficient to react with all the titanium dioxide in the feed. The reaction temperature was about 1150° C. The linear gas velocity in the reactor was approximately 39 cm. per second.

A production rate of 0.57 kg. $TiCl_4$ per dm.$^3$ reaction space per hour was obtained at a $TiO_2$ to $TiCl_4$ conversion of 86%. The chlorine utilization was approximately 86%.

From the foregoing description and examples it will be seen that the instant invention offers a simple, economical and highly efficient method and means for producing titanium tetrachloride from titaniferous ores and concentrates containing appreciable quantities of alkali metal, alkaline earth metals and magnesium the method being one requiring only a minimum of handling of the ore or ore concentrate and a recovery of relatively pure titanium tetrachloride.

While this invention has been described and illustrated by the examples shown, it is not intended to be strictly limited thereto and other modifications and variations may be employed within the scope of the following claims.

We claim:

1. In a process for producing $TiCl_4$ free of impurities by treatment of a titaniferous material containing iron and substantial amounts of metal impurities including the oxides of Mg and Ca with gaseous chlorine in a vertically disposed reactor having a dust collector below its lower end for separating solid metal chloride impurities from the gaseous chlorides of titanium and iron, the improvement comprising: feeding a mixture of finely divided titaniferous material and a carbonaceous reducing agent in finely divided solid form into the upper end of said vertically disposed reactor, introducing separately a downwardly flowing stream of gaseous chlorine, admixing said gaseous chlorine with said titaniferous material and said carbonaceous reducing agent in said reactor to form a downwardly flowing stream of reactants in said reactor, heating said stream of reactants in the absence of an auxiliary flame to react said chlorine with said titaniferous material and said carbonaceous reducing agent, the temperature in said reactor being in the range of from 1000° C.–1400° C. to flash chlorinate said titaniferous material and form a downwardly flowing stream of gaseous chlorides of titanium and iron admixed with gaseous chlorides of said metal impurities, maintaining a cooling zone in said reactor at the lower end thereof and above said dust collector, the temperature of said cooling zone being in a range between the condensing temperature and solidification temperature of said metal chloride impurities whereby said metal chloride impurities are formed as liquids adjacent the lower end of said reactor; and maintaining the cross sectional area of said downwardly flowing stream of gaseous chlorides substantially uniform throughout the length of said reactor and into said dust collector to enable said liquid chlorides to fall freely into said dust collector for collecting and separating the liquid metal chloride impurities from said gaseous chlorides of titanium and iron.

2. In a process for producing $TiCl_4$ free of impurities by treatment of a titaniferous material containing iron and substantial amounts of metal impurities including the oxides of Mg and Ca with gaseous chlorine in a vertically disposed reactor having a dust collector below its lower end for separating solid metal chloride impurities from the gaseous chlorides of titanium and iron, the improvement comprising: feeding a mixture of finely divided titaniferous material and a carbonaceous reducing agent in finely divided solid form into the upper end of said vertically disposed reactor, introducing separately a downwardly flowing stream of gaseous chlorine, admixing said gaseous chlorine with said titaniferous material and said carbonaceous reducing agent in said reactor to form a downwardly flowing stream of reactants in said reactor, heating said stream of reactants in the absence of an auxiliary flame to react said chlorine with said titaniferous material and said carbonaceous reducing agent, the temperature in said reactor being in the range of from 1000° C.–1400° C. to flash chlorinate said titaniferous material and form a downwardly flowing stream of gaseous chlorides of titanium and iron admixed with gaseous chlorides of said metal impurities; maintaining a cooling zone in said reactor at the lower end thereof and above said dust collector, the temperature of said cooling zone being in the range between the condensing temperature and solidification temperature of said metal chloride impurities whereby said metal chloride impurities are formed as liquids adjacent the lower end of said reactor; maintaining the cross sectional area of said downwardly flowing stream of gaseous chlorides substantially uniform throughout the length of said reactor and into said dust collector to enable said liquid chlorides to fall freely into said dust collector, cooling the liquid metal chloride impurities upon leaving the lower end of said reactor to solidify said chlorides upon entering said dust collector for collecting and separating the liquid metal chloride impurities from said gaseous chlorides of titanium and iron, and maintaining the temperature of said dust collector at about 300° C. to maintain the solidified chlorides in a dry state in said dust collector.

3. Process according to claim 1 in which the gaseous reaction products, including gaseous $TiCl_4$ and iron chlorides recovered from said initial cooling step are subsequently cooled to desublime said iron chlorides without condensing the gaseous $TiCl_4$, separating said desublimed iron chloride from said gaseous $TiCl_4$ and thereafter cooling said gaseous $TiCl_4$ to recover liquid $TiCl_4$.

4. Process according to claim 2 in which the gaseous $TiCl_4$ and iron chlorides recovered from the second cooling step are cooled to a temperature slightly above the dew point of the titanium tetrachloride in the exit gas.

5. Process according to claim 1 in which the condensed materials recovered from the initial cooling step are leached with water and the undissolved titanium values separated, dried and recycled to the reaction chamber.

6. Process according to claim 1 in which the titaniferous material and carbonaceous reducing agent are passed co-currently in a downward stream through the reaction chamber and the chlorine is introduced tangentially into the reaction chamber.

7. Process according to claim 1 in which oxygen is added together with said titaniferous material, carbonaceous reducing agent and chlorine.

References Cited in the file of this patent

UNITED STATES PATENTS

| | | |
|---|---|---|
| 1,434,485 | d'Adrian | Nov. 7, 1922 |
| 1,814,392 | Low et al. | July 14, 1931 |
| 1,867,672 | McAfee | July 19, 1932 |
| 1,876,084 | Staib | Sept. 6, 1932 |
| 2,020,431 | Osborne et al. | Nov. 12, 1935 |
| 2,502,916 | Bar | Apr. 4, 1950 |
| 2,596,609 | Shabaker | May 13, 1952 |
| 2,701,180 | Krchma | Feb. 1, 1955 |
| 2,723,903 | Cyr et al. | Nov. 15, 1955 |
| 2,897,063 | Breier | July 28, 1959 |
| 2,943,704 | Coates et al. | July 5, 1960 |

FOREIGN PATENTS

| | | |
|---|---|---|
| 141,908 | Great Britain | Apr. 29, 1920 |
| 724,193 | Great Britain | Feb. 16, 1955 |

OTHER REFERENCES

Roscoe and Schorlemmer, "A Treatise on Chemistry," vol. II, p. 613 (1907), published by MacMillan and Co., London, England.

Chemical Engineering, vol. 64, No. 9, pp. 170 and 172 (September 1957).